United States Patent [19]

Testa

[11] 4,306,760

[45] Dec. 22, 1981

[54] CABLE CONNECTOR ASSEMBLY

[75] Inventor: Rosario Testa, Ridgefield, Conn.

[73] Assignee: The Perkin-Elmer Corporation, Norwalk, Conn.

[21] Appl. No.: 117,033

[22] Filed: Jan. 31, 1980

[51] Int. Cl.³ ............................................ H01R 13/58
[52] U.S. Cl. ........................ 339/103 M; 174/DIG. 8; 339/107; 339/DIG. 1
[58] Field of Search .............. 339/103 R, 103 M, 107, 339/DIG. 1; 174/DIG. 8

[56] References Cited

U.S. PATENT DOCUMENTS

| | | | |
|---|---|---|---|
| 3,907,397 | 9/1975 | Damon | 339/DIG. 1 X |
| 4,160,572 | 7/1979 | Adelberger | 339/103 M X |
| 4,165,145 | 8/1979 | Steinbach | 339/103 M X |
| 4,233,534 | 11/1980 | Tharman | 339/DIG. 1 X |

Primary Examiner—Eugene F. Desmond
Attorney, Agent, or Firm—S. A. Giarratana; E. T. Grimes; R. A. Hays

[57] ABSTRACT

A recessed housing and cover are held together by self-tapping screws. The housing is provided with a half round extension having an inner diameter slightly larger than the outer diameter of the cable. The cable insulation is removed to about the middle of the extension and is held tightly to the extension and the assembly by means of two layers of heat shrunk plastic tubing. Wires from the cable to the pins of a multi-pin military type connector are contained within the recess. The military connector is provided with a surrounding flange which is held in engagement with a pair of outrigger bosses on the recessed housing. The recessed housing and the top cover are also provided with opposed flanges for engagement with the flange of the military type connector.

Alternatively when the connector must be repaired in the field the heat shrinkable tubing may be replaced with tightly wrapped stretchy elastomeric electrical tape, or additional pieces of heat shrinkable tubing may be left on the assembled cable for later use when repairs are necessary.

12 Claims, 5 Drawing Figures

CABLE CONNECTOR ASSEMBLY

BACKGROUND ART

Standard rectangular military type connectors such as M24308/4-15 AMP No. 79-35 must be provided with a housing to protect the back end of the connector and the fine wires of the cable where the cable insulation has been removed and to provide a tight connection between the housing, the connector, and the cable so that the cable cannot be pulled out of the housing, destroying the connections.

The housings provided by the connector manufacturers utilize various clamps for rigidly gripping the cable. However these clamps usually engage the cable over a very short distance and repeated flexing of the cable at the clamp leads to cable failure. Furthermore, the housings provided by the manufacturers are very expensive and the cables usually exit the housing directly behind and in a direction away from the connector which is undesirable from the standpoint of space and cable layout in many instances.

DISCLOSURE OF THE INVENTION

By providing a housing having a half cylinder extended portion interfitting along an extended portion of the cable, the two being surrounded with heat shrunk plastic tubing, I am able to provide extremely good stress relief, repairability in the field-(the heat shrunk tubing may be replaced with stretchy electrical tape), and the cable may come off the connector at any angle.

According to my invention I also provide outrigger bosses which hold the peripheral flange of the connector by means of screws passing through the flange and the bosses, and additional opposing flanges on the recessed housing and top for again engaging the flange of the standard connector.

OBJECTS OF THE INVENTION

It is therefore an object of the invention to provide improved cable connector assemblies.

Another object of the invention is to provide improved stress relief for such cables.

Still another object of the invention is to provide cable extension from such assemblies at any desired angle.

A yet further object of the invention is to provide assemblies of the above character which are easily repaired in the field.

Another object of the invention is to provide such assemblies which are inexpensive, easy to assemble and reliable.

Other objects of the invention will in part be obvious and will in part appear hereinafter. The invention accordingly comprises the features of constructions, elements and arrangements of parts possessing the features and relations of elements all of which will be exemplified in the constructions hereinafter described. The scope of the invention will be indicated in the claims.

BRIEF DESCRIPTION OF THE DRAWINGS

For a further understanding of the nature and objects of the invention, reference should be had to the following detailed description taken in connection with the accompanying drawings of which.

The same reference characters refer to the same elements throughout the several views of the drawings.

BEST MODE FOR CARRYING OUT THE INVENTION

Figure 1:
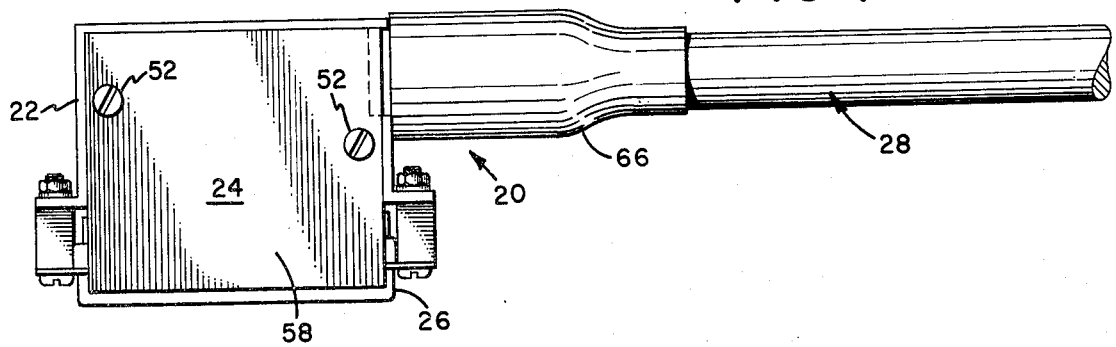
FIG. 1 is a top view of a cable connector assembly according to the invention.
Figure 2:
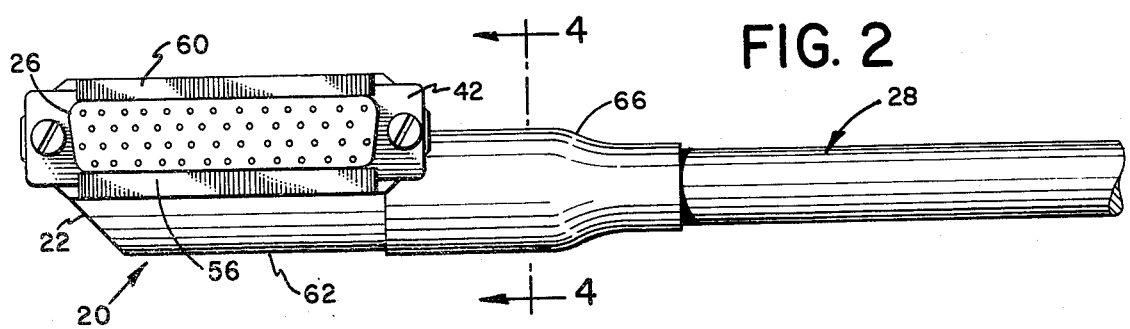
FIG. 2 is a front view of the cable connector assembly of FIG. 1.
Figure 3:
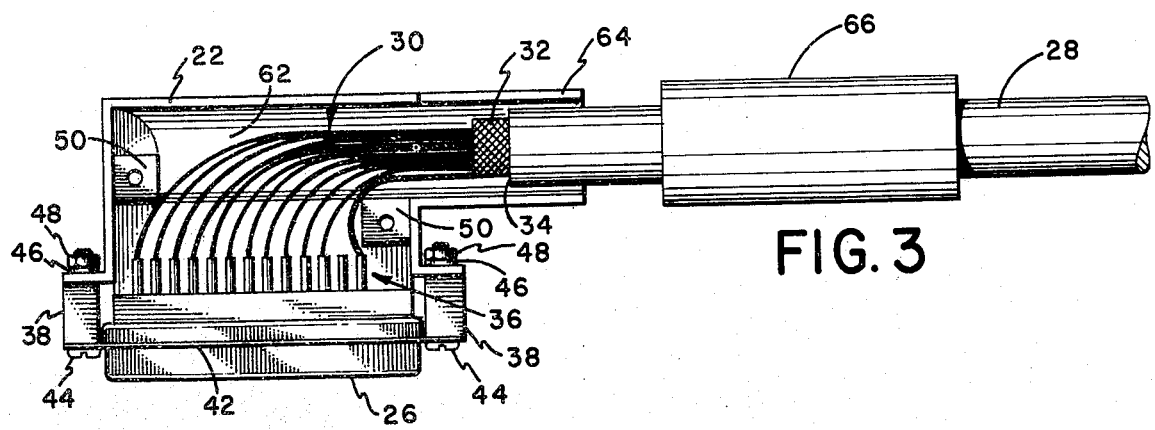
FIG. 3 is a top view of a partially assembled cable connector assembly as shown in FIG. 1.

A cable connector assembly according to the invention is generally indicated at 20 in FIGS. 1 and 2. As shown in FIGS. 1 through 4 it comprises a recessed housing 22 and cover 24 which carry a standard multi-pin connector 26, previously described.

Cable 28 comprises a plurality of conductors generally indicated at 30, coaxial ground sleeve 32, and an insulating covering 34. Wires 30 are connected to a plurality of connector pins generally indicated at 36 in the connector 26.

Figure 4:
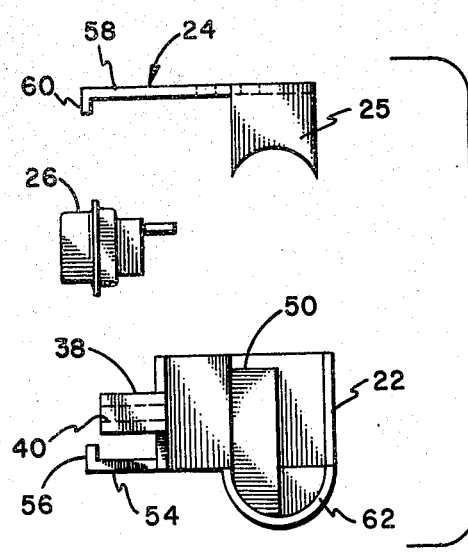
FIG. 4 is an exploded view of the connector housing of FIGS. 1 and 2 taken along line 4—4 of FIG. 2.

The recessed housing 22 is provided with a pair of bosses 38, 38, having screw holes 40 therethrough, only one of which is shown dotted in FIG. 4. In this manner the flange 42 of the connector 26 may be held to the bosses 38 by means of screws 44, 44, locking washers 46, 46, and nuts 48, 48.

Recessed lower housing 22 is also provided with a pair of inner bosses 50, 50, to which the cover 24 is attached by means of self-tapping screws 52, 52.

Recessed housing 22 is provided with an extension 54 terminating in a flange 56. Cover 24 is similarly provided with an extension 58 terminating in a flange 60. Flanges 60 and 56 engage flange 42 of connector 26 and aid in its retention within the housing 22.

Recessed housing 22 is provided with a semi-cylindrical portion 62 terminating in an extended portion 64 in which the inner cable insulation 34 and coaxial grounds 32 are terminated. The diameter of portions 62 and 64 is slightly larger than the outer diameter of cable 28.

Before the wires 30 are connected to the connector 26 a pair of coaxial sleeves 66 of heat shrinkable tubing (only one of which can be seen in the drawings) are placed about cable 28. After the assembly 20 is assembled as shown in FIGS. 1 and 2, the sleeves 66 are pushed to the left until the edges thereof engage the recessed housing 22 and are shrunk through the application of heat from a tool similar to a hair dryer. The thus shrunk tubing 66 grabs the cable 28 and the coaxial ground 32 and hold them tight against the extended portion 64 of the recessed housing 22. Any strain through bending the cable 28 with respect to the extension 64, because of the resilience of the tubing 66, is spread out over an extended portion of the cable 28. This reduces the possibility of electrical failure which is quite common in small area stress relief clamps used in the prior art. Thus, as shown in FIG. 5 a great quantity of cable 28 may be supported by the cable connector assembly 20.

Flange 25, at right angles to the top of the cover 24, aids in closing off the housing at extension 64.

Figure 5:
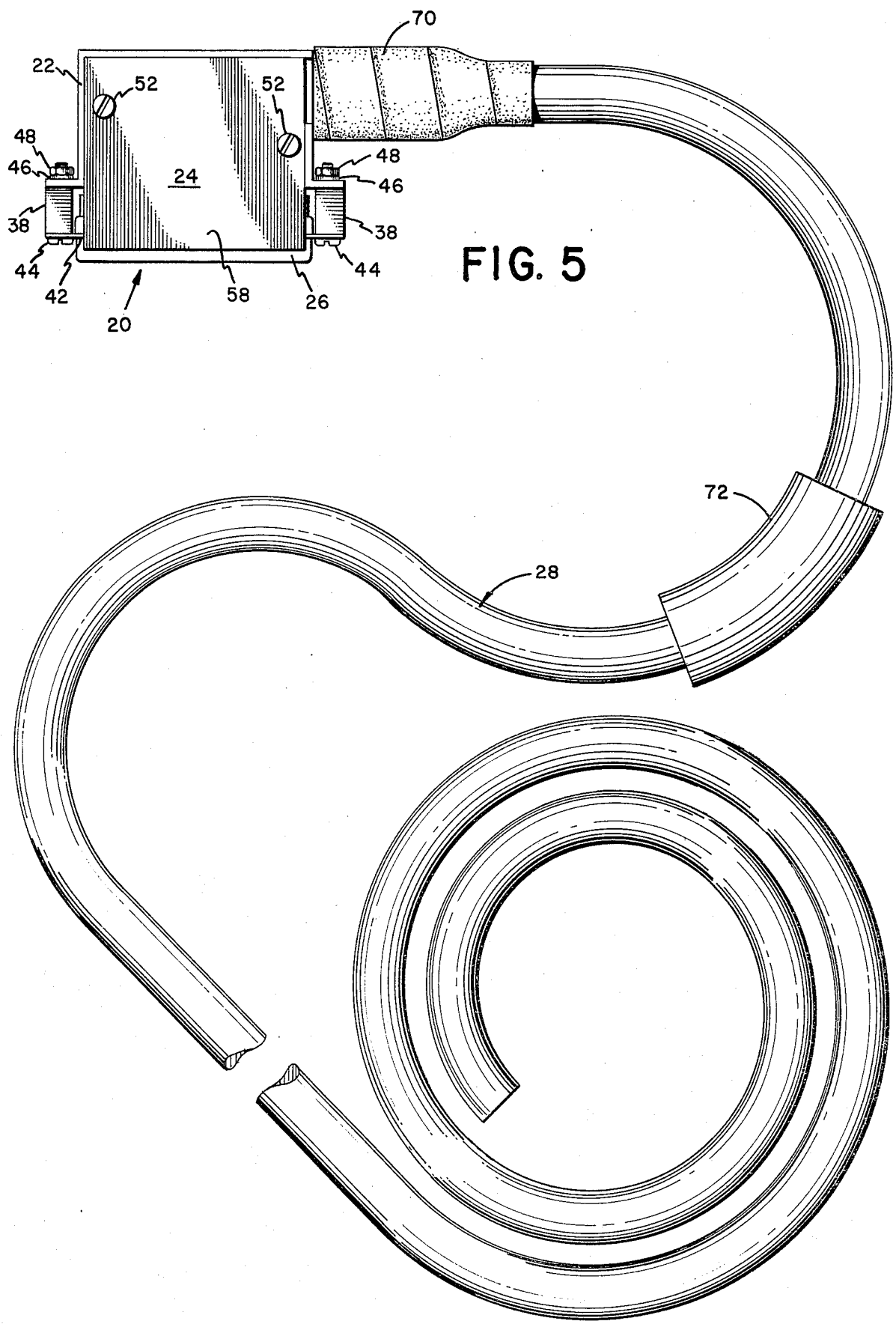
FIG. 5 is a top view similar to FIG. 1 of alternative embodiments of the invention.

Now referring to FIG. 5, if it becomes necessary in the field to remove the heat shrunk tubing 66 to service the connector assembly 20, when the servicing is completed the extension 64 and the cable 28 may be wrapped with elastomeric pressure sensitive electrical tape 70 as shown. Alternatively, another pair of elastomeric coaxial heat shrinkable tubes 72 may be provided on the cable 28 which may be employed after the original shrunk tubings 66 have been removed in servicing.

Those skilled in the art will understand that the use of a tube of elastomeric material under tension over a large area of the cable and the housing extension provides high reliability of the connector assembly 20. Those skilled in the art will also understand that the extended portion 64 of the recessed housing 22 may extend at any angle from the recessed housing 22 and this is one of the very practicable features of the invention. Furthermore, although I have described my invention as applied to an electrical connector, it can be applied to any cable connector, one employing fiber optics, for example.

It will thus be seen that the objects set forth above among those made apparent from the preceding description are effeciently attained and since certain changes may be made in the above constructions without departing from the scope of the invention, it is intended that all matter contained in the above description or shown in the accompanying drawings shall be interpreted as illustrative and not in a limiting sense. It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A cable connector assembly comprising an elongated cable and a connector housing characterized by an extended portion for engagement along a portion of said cable, and tubular elastomeric material about said extended portion and said portion of said cable under hoop tension, whereby said cable is held in tight engagement with said connector, an elastomeric coaxial heat shrinkable tube mounted on said cable spaced from but adjacent said connector housing for mounting on said extended portion after said tubular elastomeric material has been removed in servicing.

2. The connector of claim 1 wherein said tubular elastomeric material is heat shrunk plastic tubing.

3. The connector of claim 2 wherein there are two layers of heat shrunk plastic tubing about said portions.

4. The connector of claim 1 wherein said tubular elastomeric material is pressure sensitive plastic tape wrapped about said portions.

5. The cable connector assembly of claim 1 wherein said connector housing comprises:
   (a) a recessed first portion having a pair of outrigger bosses on either side thereof,
   (b) a second portion for covering said recess.

6. The cable connector assembly of claim 5 and a multiple connection connector connected to said cable retained against said bosses.

7. The cable connector assembly of claim 6 wherein said connector is provided with flanges engaging said bosses.

8. The cable connector assembly of claim 7 wherein said flanges are held to said bosses by fasteners passing through said bosses and said flanges.

9. The cable connector assembly of claim 8 wherein said flanges surround said connector and said first and second portions of said housing are provided with opposed flanges cooperating with the flanges of said connector to hold it against said bosses.

10. The connector of claims 5, 6, 7, or 8 wherein said tubular elastomeric material is heat shrink plastic tubing.

11. The connector of claim 10 wherein there are two layers of heat shrunk plastic tubing about said extended portion.

12. The connector of claims 1, 2, 3 or 4 wherein said extended portion is semi-cylindrical and has an inside diameter substantially the same to slightly larger than the outside diameter of said cable.

* * * * *

UNITED STATES PATENT AND TRADEMARK OFFICE
Certificate

Patent No. 4,306,760                            Patented December 22, 1981

Rosario Testa

Application having been made by Rosario Testa, the inventor named in the patent above identified, and The Perkins-Elmer Corporation, the assignee, for the issuance of a certificate under the provisions of Title 35 Section 256, of the United States Code, adding the name of John P. Herman as joint inventor, and a showing and proof of facts satisfying the requirements of the said section having been submitted, it is this 10th day of July, 1984, certified that the name of the said John P. Herman is hereby added to the said patent as a joint inventor with the said Rosario Testa.

Fred W. Sherling,
*Associate Solicitor.*